(12) United States Patent
Ali et al.

(10) Patent No.: US 9,342,677 B2
(45) Date of Patent: May 17, 2016

(54) METHOD AND APPARATUS TO PROVIDE CONTINUOUS AUTHENTICATION BASED ON DYNAMIC PERSONAL INFORMATION

(75) Inventors: Shirook M. Ali, Milton (CA); Christopher Labrador, Waterloo (CA); James Warden, Fort Worth, TX (US); Kelce S. Wilson, Murphy, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 258 days.

(21) Appl. No.: 13/814,012

(22) PCT Filed: Aug. 4, 2010

(86) PCT No.: PCT/US2010/044388
§ 371 (c)(1),
(2), (4) Date: Feb. 4, 2013

(87) PCT Pub. No.: WO2012/018326
PCT Pub. Date: Feb. 9, 2012

(65) Prior Publication Data
US 2013/0133055 A1 May 23, 2013

(51) Int. Cl.
*G06F 21/32* (2013.01)
*G06F 21/62* (2013.01)
(Continued)

(52) U.S. Cl.
CPC ............ *G06F 21/32* (2013.01); *H04L 63/0861* (2013.01); *H04L 63/107* (2013.01);
(Continued)

(58) Field of Classification Search
CPC ... H04L 63/0861; H04L 63/107; H04L 63/08; G06F 21/10; G06F 21/30; G06F 21/31; G06F 21/32; G06F 21/60; G06F 21/62; G06F 21/6218; G06F 21/6245

USPC ............................................................ 726/7
See application file for complete search history.

(56) References Cited

U.S. PATENT DOCUMENTS 7,562,218 B2 7/2009 Kirkup et al.
2002/0174347 A1* 11/2002 Ting .............................. 713/186
(Continued)

FOREIGN PATENT DOCUMENTS

CN 101583967 A 11/2009
CN 101689994 A 3/2010
(Continued)

OTHER PUBLICATIONS

Notification Concerning Transmittal f of International Preliminary Report on Patentability (Chapter I of the Patent Cooperation Treaty) for corresponding Application No. PCT/US2010/044388), dated Feb. 14, 2013.
(Continued)

*Primary Examiner* — Kaveh Abrishamkar
*Assistant Examiner* — Ayoub Alata
(74) *Attorney, Agent, or Firm* — Conley Rose, P.C.; J. Robert Brown, Jr.

(57) ABSTRACT

An authentication method, system and device are provided to continuously collect dynamic personal identification data (DPID) samples through a user device by using one or more sensors to continuously collect biometric and location data samples associated with the user and then securely transfer the DPID samples to a central authentication server where attributes of the DPID samples may be captured and incorporated as part of a challenge-response pair which requests an arbitrarily generated N-tuple of the DPID samples from a predetermined time interval from the user device that is unique to the user and dynamic based on the sensed data and the time-interval of collection.

27 Claims, 10 Drawing Sheets

(51) Int. Cl.
H04L 29/06 (2006.01)
G06F 21/10 (2013.01)
G06F 21/30 (2013.01)
G06F 21/60 (2013.01)
G06F 21/31 (2013.01)

(52) U.S. Cl.
CPC .............. G06F 21/10 (2013.01); G06F 21/30 (2013.01); G06F 21/31 (2013.01); G06F 21/60 (2013.01); G06F 21/6218 (2013.01); G06F 21/6245 (2013.01); H04L 63/08 (2013.01)

(56) References Cited

U.S. PATENT DOCUMENTS

| | | | |
|---|---|---|---|
| 2003/0065626 | A1 | 4/2003 | Allen |
| 2006/0222211 | A1* | 10/2006 | Olivo et al. ............. 382/115 |
| 2009/0058734 | A1 | 3/2009 | Ali et al. |
| 2009/0282247 | A1 | 11/2009 | Kirkup et al. |
| 2010/0111279 | A1 | 5/2010 | Gisby et al. |
| 2010/0127938 | A1 | 5/2010 | Ali et al. |

FOREIGN PATENT DOCUMENTS

| | | |
|---|---|---|
| EP | 1755270 A1 | 2/2007 |
| WO | 03067404 A1 | 8/2003 |
| WO | 2006067739 A2 | 6/2006 |

OTHER PUBLICATIONS

Bolle et al, "Biometric Perils and Patches", Pattern Recognition 35 (2002), pp. 2727-2738.
Lahav, "HTTP Authentication: Token Access Authentication draft-hammer-http-token-auth-01", Network Working Group, Feb. 3, 2010, pp. 1-20.
Pomazan, "Active Data Transportation and Processing for Chronic Diseases Remote Monitoring", International Conference on Signal Processing Systems, 2009, 1 page.
Bolle et al, "Biometric Perils and Patches", Pattern Recognition 35, The Journal of the Pattern Recognition Society, 2002, pp. 2727-2738.
Elmufti et al, "Timestamp Authentication Protocol for Remote Monitoring in eHealth", Information Engineering Research Centre, School of Engineering and Mathematical Sciences, 2008,4 pages.
Wu, "The Secure Remote Password Protocol", Computer Science Department, Stanford University, 1997, pp. 1-23.
Chou, "Strong User Authentication on the Web", The Architecture Journal, Aug. 2008, 8 pages.
Podio et al, "Biometric Authentication Technology: From the Movies to Your Desktop", Biometrics, 2007, 8 pages.
"Characteristics of Successful Biometric Identification Methods", 2010, 2 pages.
Denning et al, "Location-Based Authentication: Grounding Cyberspace for Better Security", Computer Fraud & Security, Feb. 1996, pp. 1-6.
International Search Report and Written Opinion for PCT/US2010/044388, dated May 4, 2011, pp. 1-11.
Bolle et al, "Biometric Perils and Patches", Pattern Recognition 35, 2002, pp. 2727-2738.
Notification Concerning Transmittal of International Preliminary Report on Patentability (Chapter I of the Patent Cooperation Treaty) for corresponding Application No. PCT/US2010/044388, International Filing Date: Aug. 4, 2010, dated mailed: Feb. 5, 2013, pp. 1-16.
Canadian Office Action; Application No. 2,807,189; Nov. 25, 2014; 3 pages.
Chinese Office Action as Received in Co-pending Application No. 201080069483.0 on Dec. 10, 2014; 6 pages. (No English translation available).
European Examination Report; Application No. 10745488.6; Jun. 26, 2015; 4 pages.
Chinese Office Action as Received in Co-pending Application No. 201080069483.0 on Sep. 2, 2015; 13 pages. (No English translation available).
Canadian Office Action; Application No. 2,807,189; Jan. 5, 2016; 6 pages.
Chinese Office Action as Received in Co-pending Application No. 201080069483.0 on Mar. 11, 2016; 3 pages. (No English translation available).

* cited by examiner

METHOD AND APPARATUS TO PROVIDE CONTINUOUS AUTHENTICATION BASED ON DYNAMIC PERSONAL INFORMATION

PRIORITY CLAIM

This is a U.S. National Stage Application of International Application No. PCT/US2010/044388 entitled, "METHOD AND APPARATUS FOR PROVIDING CONTINUOUS AUTHENTICATION BASED ON DYNAMIC PERSONAL INFORMATION," filed on Aug. 4, 2010, which is incorporated herein by reference in its entirety.

BACKGROUND

1. Field

The present inventive concept is directed in general to communications systems and methods to operate same. In one feature, the present disclosure relates to the methods, systems and devices to authenticate a user of a computer by using a handheld electronic device.

2. Description of the Related Art

Technical advances in communication systems now allow mobile devices to be used in a variety of remote monitoring applications. For example, mobile device hardware and software have been developed to support various healthcare applications. But with remote monitoring systems, there must be an authentication process provided to prevent the misuse of the system by confirming the identity of the entity involved in the process. Authentication systems that have been developed to withstand identity-theft attacks typically use enhanced shared-secret and/or multifactor authentication techniques which employ a compound implementation of two or more classes of human-authentication factors:
  1. Something the user knows (e.g., knowledge-based information, such as password, pass phrase, shared secrets, account details and transaction history, PIN, CAPTCHA, and so on);
  2. Something the user has (e.g., possession-based information, such as ATM card, security token, smart card, shared soft tokens, mobile device, and so on); and
  3. Something the user is (e.g., identity-based information, such facial recognition, fingerprint, voice recognition, keystroke dynamics, signature, and so on).

Many existing enterprise extranet/VPN solutions require both simple knowledge-based credentials (such as ID and password) and hardware tokens (such as secure ID with time-based one-time password generators, smart cards that use embedded PKI solutions, and so on) in order to gain access. And when the third factor is required, existing solutions typically require that attributes of the third factor be captured and incorporated into the solution before the system is deployed for that user (e.g., typically at the time of registration or enrollment). Even with multifactor authentication techniques, identity theft attacks remain a significant challenge, especially in applications such as healthcare where the management and control of access to confidential and sensitive data raises vital privacy concerns. While identity theft attacks can be prevented by using strong digital signatures, such solutions often require additional complexity, thereby compromising usability and ubiquity.

Accordingly, a need exists for improved authentication method, system and device to overcome the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present inventive concept may be understood, and its numerous objects, features and advantages obtained, when the following detailed description is considered in conjunction with the following drawings, in which.

DETAILED DESCRIPTION

Figure 1:
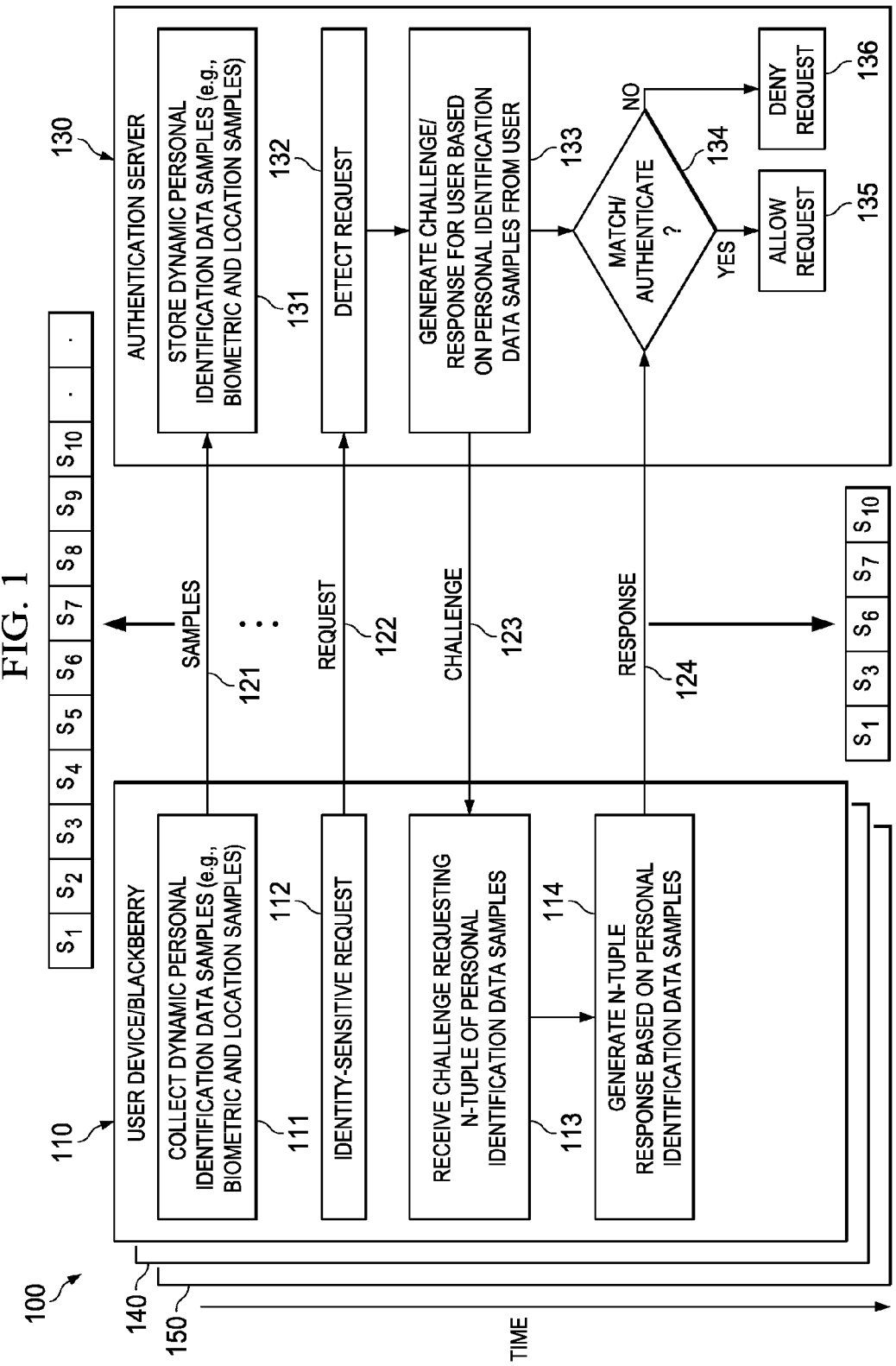
FIG. 1 illustrates an example signal flow of a continuous authentication procedure to use dynamic personal information collected at a user device.

An authentication method, system and device are provided to authenticate a user of a computer by continuously collecting dynamic personal identification data (DPID) samples from the user, such as by using one or more sensors to continuously collect biometric and location data samples associated with the user. In selected embodiments, biometric data samples (e.g., biometric or behavior biometric traits, such as the user's heart-rate, voice activity, pulse rate, blood pressure, and other vital signs) are captured by one or more sensors as a sequence of biometric samples that are recorded by a mobile device and/or stored in a secure server. At the same time, location data is also captured at the mobile device as a sequence of associated data samples to record the physical location of the user's mobile device. When the mobile device is located near the user, the location data captured at the user's mobile device (e.g., GPS coordinates of the mobile device or the identity of a serving cellular base station tower having a coverage area indicating a location region) effectively identifies at least the approximate physical location of the user. When relying on cellular infrastructure-based location data information, if the location data from a user changes abruptly by an amount or to a location that is not feasible, then such a change can signal an attempt to spoof the user's identity, provided that allowances are made to account for some amount of location change (e.g., from a user travelling up an elevator). By securely transferring the DPID samples to one or more remote authentication servers, attributes of the DPID samples may be captured and incorporated as an identity-based authentication factor whenever an authentication event occurs. For example, the authentication server can use the DPID samples to generate a challenge-response pair where the challenge requests an arbitrarily generated N-tuple of the DPID samples from a predetermined time interval that is to be confirmed against the DPID samples already securely provided by the user's mobile device. By continuously providing DPID samples, the authentication server is able to generate a challenge-response pair that is (i) unique to that user and (ii) dynamic based on the sensed data and the time-interval of collection. In selected embodiments, the captured biometric data samples (e.g., user's heart-rate or other vital sign) that are to be securely passed to the solution server for their intended purpose (e.g., a doctor keeping track of a patient's recovery) can first be used as a dynamic biometric data factor to authenticate in order to verify the identity of the user. The disclosed authentication process can be usefully applied in many applications, including electronic health (eHealth) applications in which the conditions of a patient are remotely monitored.

Various illustrative embodiments of the present inventive concept will now be described in detail with reference to the accompanying figures. While various details are set forth in the following description, it will be appreciated that the present inventive concept may be practiced without these specific details, and that numerous implementation-specific decisions may be made to the inventive concept described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram and flow chart form, rather than in detail, in order to avoid limiting or obscuring the present inventive concept. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present inventive concept will now be described in detail below with reference to the figures.

FIG. 1 illustrates an example signal flow of a continuous authentication procedure between an authentication server 130 (such as may be located at a host system, solution server, or other communication device) and one or more user devices 110, 140, 150 (such as a mobile device, BlackBerry device or other user equipment) which exchange messages 121-124 to authenticate the user device 110 using dynamic personal information collected at the user device 110. As will be appreciated, an authentication server may be implemented as a device and/or application used to control network access by facilitating authentication of an entity that attempts to access the network. Such an entity may be a human user or another server. An authentication server can reside in a dedicated computer, an Ethernet switch, an access point or a network access server. On some predetermined basis (such as a polling interval), the user device 110 activates a sampling process to collect dynamic personal identification data samples associated with the user device 110. The sample collection process may be activated under control of a DPID sample collection module 111 at the user device 110 which interacts with one or more sensors (not shown) to continuously collect and store biometric and location data samples (e.g., S1, S2, etc.) that are associated with the user device 110. Thus, each sample (e.g., S1) may include a biometric characteristic component (e.g., the user's heart-rate) and an associated location characteristic component (e.g., the location of the user device), alone or in combination with contextual information, such as a time stamp value of each component, a BlackBerry key, or the like). The collected DPID samples are stored at the user device 110 or otherwise accessible to subsequently retrieve and use in responding to an authentication challenge, as described more fully herein below.

As the DPID samples (e.g., S1-S10, etc.) are collected and stored over time, the user device 110 also passes the samples 121 along to the authentication server 130. As will be appreciated, any desired signaling or message scheme and format may be used to send the DPID samples 121 to the authentication server 130. In addition, the DPID samples 121 from the user device 110 may be sent over a secure link to the authentication server 130. At the authentication server 130, the DPID samples 121 are received and stored under control of a DPID sample storage module 131. In this way, both the user device 110 and the authentication server 130 have access to the same DPID samples 121 which provide continuous and dynamic identity-based information about the user device 110 in the form of biometric and location information from the user device 110. At a minimum, the user device 110 and authentication server 130 may be configured to have shared access to DPID samples for at least a predetermined minimum time interval (e.g., 10 samples) by continuously collecting and storing DPID samples in memory at the user device 110 and authentication server 130.

When an authentication event occurs at the user device 110, and identity-sensitive request module 112 notifies the authentication server 130 by sending a request 122 using any desired signaling or message scheme. At the authentication server 130, a detection module 132 receives and detects the request 122, and in response thereto, an authentication module 133 generates a challenge-response pair of the user device 110 based on the DPID samples from the user device 110 that are stored at the authentication server 130. As will be appreciated, the generated challenge-response pair may be generated as part of enhanced shared-secret and/or multifactor authentication technique which employs two or more classes of human-authentication factors. Alternatively, the authentication server may use any desired authentication algorithm or sequence in which attributes of the DPID samples collected at the user device 110 are compared with attributes of the DPID samples 121 conveyed to the authentication server 130. Thus, the generated challenge 123 may be generated using any desired authentication protocol, provided that the challenge presented to the user device 110 and the resulting response thereto are based on the DPID samples collected from the user device 110. In selected embodiments, the authentication module 133 generates and transmits a challenge 123 which requests from the user device 110 an N-tuple from the saved DPID samples. In the event there is any limit S to the number of DPID samples saved on the user device 110 and/or authentication server 130, the authentication module 133 generates a challenge 123 which requests an N-tuple from the saved DPID samples, where $1 \leq N \leq S$. As but an illustrative example, the challenge may request that the first (S1), third (S3), sixth (S6), seventh (S7), and tenth (S10) samples be generated and returned by the user device 110. However, as will be appreciated, the number of tuples, N, may also be randomly or arbitrarily generated and/or ordered by the authentication module 133 each time a challenge is generated. In addition, it will be appreciated that the challenge 126 can be any mathematical function which generates a unique value corresponding to one or more of the DPID samples collected from the user device 110.

At the user device 110, the challenge 126 is received by the reception module 113. In response thereto, the authentication module 114 generates the requested response based on the collected DPID samples that are stored at the user device 110. The authentication module 114 then generates and returns to the authentication server 130 the response 124, illustrated herein by way of example as an N-tuple consisting of the first (S1), third (S3), sixth (S6), seventh (S7), and tenth (S10) samples. Again, the generated N-tuple response 124 can be based on between 1 and S samples as randomly or arbitrarily defined each time the challenge 126 is generated, or can be generated using any predetermined mathematical function which generates a unique value corresponding to one or more of the DPID samples collected from the user device 110.

When the response 124 is received at the authentication server 130, it is compared to the challenge 123 to determine if there is a match (decision module 134). In this way, biometric and location information collected at the user device 110 is compared with biometric and location information stored at the authentication server 130 over a predetermined time interval or DPID sample count any time an authentication event occurs. When there is match (affirmative outcome from decision 132), authentication is confirmed and the identity-sensitive request is allowed (approval 135). However, if the challenge and response do not match, authentication is denied and the identity-sensitive request is rejected (denial 136).

By capturing DPID samples that are updated over time, attributes of the DPID samples may be incorporated as an identity-based authentication factor, alone or in combination with other authentication factors. The dynamic nature of the DPID samples allows them to be used as an authentication factor after system deployment, instead of relying on identity-based authentication factors that remain constant over the lifetime of the application. By employing sensors at the user device 110 to measure personal health information (e.g., pulse rate, blood pressure, and other vital signs) and physical location, the captured information may continuously provide updated DPID samples along with context information to authenticate factors in conjunction with other existing security methods to dramatically increase the likelihood of successfully confirming an individual's identity.

Figure 2:
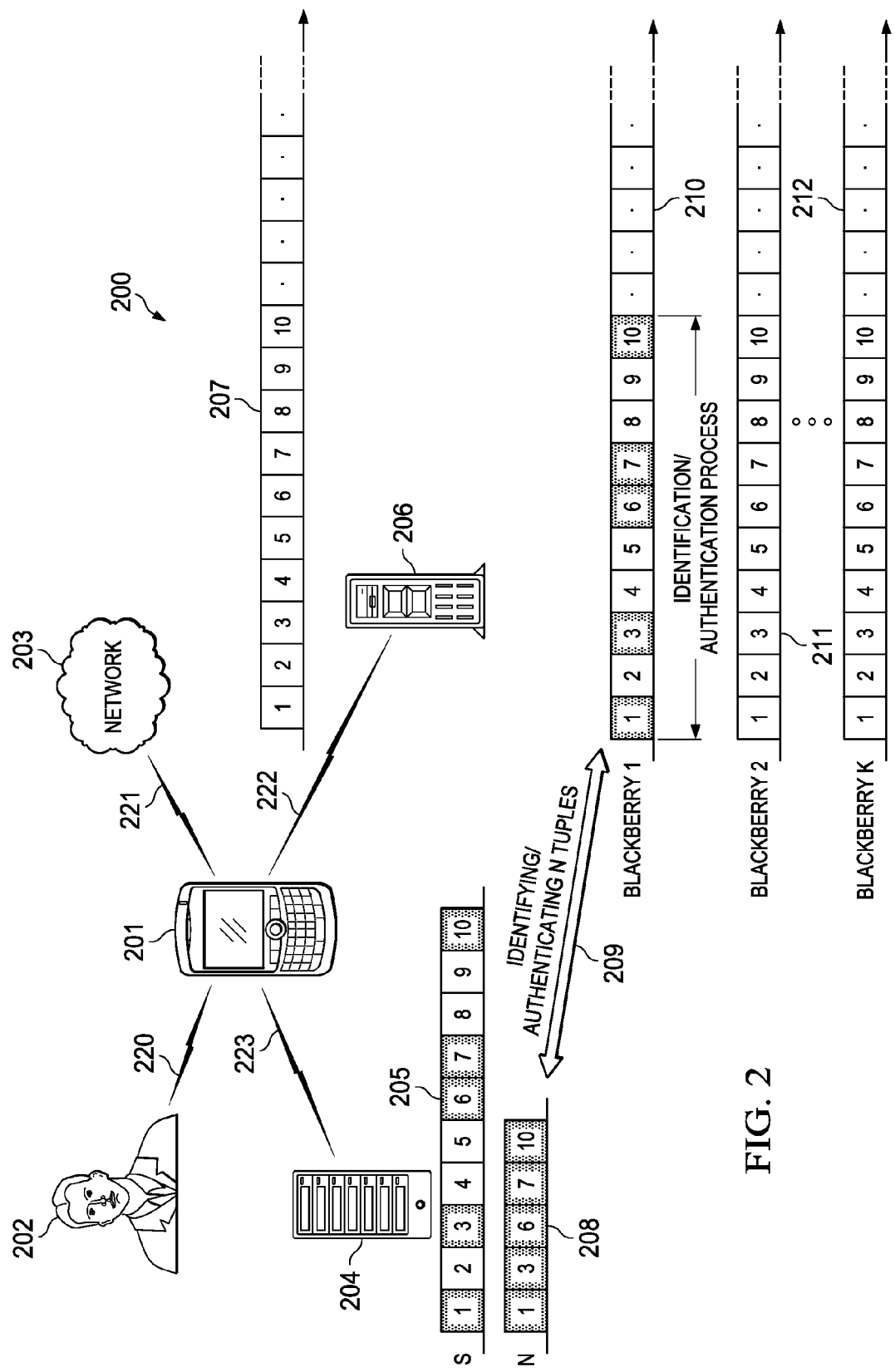
FIG. 2 illustrates an example authentication system and methodology in accordance with selected embodiments of the disclosure.

FIG. 2 illustrates an example authentication system and methodology wherein a secure infrastructure 200 may be used to provide identity-based authentication information from a BlackBerry mobile device 201 to a solution server 206 where it is subsequently used to verify the identity of the BlackBerry user 201. In the disclosed methodology, one or more identity-based authentication factors may be used to identify the user 202. In selected embodiments, two elements (e.g., biomedical and location information) associated with the user 202 may be used for identification. When the first element is biometric information relating to the user 202, sensors (not shown) located at the user 202 capture and record dynamic biometric information, such as the user's heart-rate, voice activity, pulse rate, blood pressure, and other dynamic or changing vital signs. The captured biometric information is transmitted or conveyed 220 to the BlackBerry device 201. The biometric information may be saved as a sequence of samples on the user's BlackBerry device 201, such as by storing the samples in the cache history record. In addition or in the alternative, the biometric information may be transmitted or conveyed 223 to a secure infrastructure or enterprise server 204 to store, in which case the complete sample history may be stored. In selected embodiments, the secure infrastructure server 204 is connected to and accessible by the BlackBerry device 201. The secure infrastructure server 204 could be one or more entities that control access to secure data and that perform an authentication procedure on a user of the BlackBerry device 201 in order to allow the user access to the secure data. For example, the authenticating entities 200 might be banks, credit card companies, utility companies, online retailers, online payment mediators, internet service providers, or other entities. Whether stored at the BlackBerry device 201, the secure infrastructure server(s) 204, or both, the captured biometric information is included in the sample sequence 205 shown in FIG. 2.

The second element in the authentication may be the location history corresponding to the user 202. To capture the location history information, the mobile device 201 continuously records its physical location, such as by requesting location or positioning data that is transmitted or conveyed 221 by the network 203. The requested location or positioning data may be saved as a sequence of location history samples on the user's BlackBerry device 201, such as by storing the location history samples in the cache history record. As will be appreciated, the location history samples can be stored as a sequence of position value entries which each specify the location of the user 202. Alternatively, a compressed location history may be stored by recording location information only if a change occurs in the position compared to the previous entry, but otherwise storing a "no change" entry or flag to the history if no change has occurred. As shown, the location history information may also be stored at a secure infrastructure or enterprise server 204, in which case the complete sample history may be stored. As stored, the captured location history information is included with the corresponding biometric information in the sample sequence 205, such as by storing biometric and location samples together with their corresponding time stamp information.

In addition to retaining a copy of the sample sequence 205 at the BlackBerry device 201 and/or secure infrastructure server 204, a copy of the sample sequence 207 is securely transmitted or conveyed 222 to a solution server 206 to store and subsequent processing. The solution server 206 may also store sample sequences from additional mobile devices, in which case the sample sequence from a first mobile device 201 is stored as sample sequence 210, while a sample sequence from a second mobile device is stored as sample sequence 211, and a sample sequence from a third mobile device is stored as sample sequence 212, and so on. At the solution server 206, the biometric information associated with mobile device 201 may be extracted from the sample sequence 210 to process in connection with a health-related application. For example, a health care provider can use the solution server 206 to keep track of a patient's recovery by monitoring the biometric information from the user/patient 202.

In addition or in the alternative, the biometric information associated with mobile device 201 can be used to authenticate the identity of the user 202 when an authentication event occurs. To this end, an authentication service located at the solution server 206 (or at some other authentication server) can use the biometric information in the sample sequence 210 to generate a challenge-response pair 209 that is dynamic and unique to the user 202. In selected embodiments, the challenge from the authentication service would request an N-tuple of samples from the sample sequence 205 associated with the BlackBerry device 201. In generating a challenge, the authentication service takes into account the available number of sample sequences 205 that can be accessed by the user's BlackBerry device 201. In algorithmic terms, if the BlackBerry device 201 saves a sample sequence 205 of S=10 samples based on the amount of available memory, then the challenge 209 from the authentication service could request an N-tuple response, where $1 \leq N \leq S$ and N is randomly picked and/or ordered each time. The example N-tuple challenge shown in FIG. 2 requests samples S1, S3, S6, S7, and S10, though a different number and/or sequence of samples can be used. When each sample in the N-tuple is a package that includes the biometric information, the position information, and corresponding time stamp information associated with the mobile device 201, the requested N-tuple provides dynamic identity-based information corresponding to the BlackBerry device 201. Security is further enhanced when the authentication service dynamically or randomly determines the sequence and/or number of the samples in the N-tuples at the time of the authentication event.

In response to the challenge, the BlackBerry device 201 generates a response N-tuple 208. In FIG. 2, the response N-tuple 208 is shown as the sample sequence S1, S3, S6, S7, and S10, though again, any different number and/or sequence of samples can be used, depending on the N-tuple challenge that is received. The generate response N-tuple 208 is returned 209 to the solution server 206 using any desired messaging or signaling scheme. At the solution server 206, the response N-tuple 208 of biometric and location data from the BlackBerry device 201 is compared against the N-tuple of biometric and location data generated from the sample sequence 210 (as indicated by the shading of the sample sequence 210). To assist with the comparison, each N-tuple generated at the BlackBerry device 201 and the solution server 206 may include an associated time stamp. When the comparison shows a match, the identity of the user 202 associated with the mobile device 201 is authenticated.

The authentication process described herein can be used in either or both directions to provide uni-directional or bi-directional authentication. In one direction, a patient 202 can be authenticated by a doctor's office server 206 by continuously capturing dynamic personal information 205 (e.g., biometric and location samples) from the user 202 through the user's BlackBerry device 201, and then transmitting the dynamic personal information 207 to the doctor's office server 206 that may be used to generate challenge-response pairs 209. In the reverse direction, it may be necessary for the doctor's office server 206 to be authenticated by the patient 202, such as when the BlackBerry device 201 loses the connection with the doctor's office server 206. In this case, the BlackBerry device 201 could reestablish the secure channel by generating a challenge-response pair 209 which requests that the doctor's office server 206 return a message or response based on the dynamic personal information (e.g., biometric and location samples) previously conveyed to the doctor's office. The returned information could be compared at the user's BlackBerry device 201 against the dynamic personal information previously collected at the BlackBerry device 201.

Figure 3:
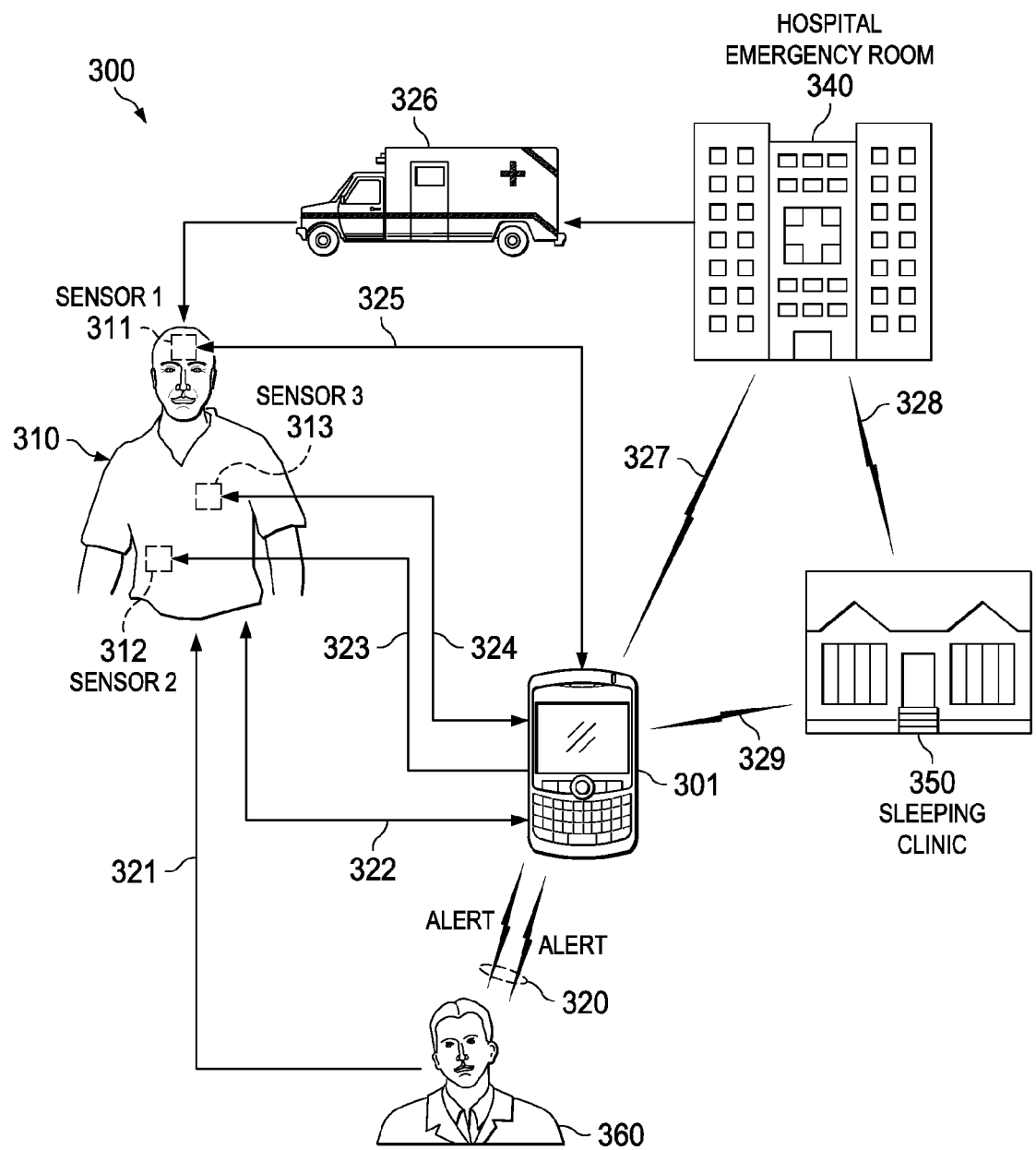
FIG. 3 provides an overview illustration of various applications of the continuous authentication process.

There are many applications where the proposed authentication process can be used, including but not limited to electronic health (eHealth) applications. FIG. 3 provides an overview illustration of an eHealth system 300 where the continuous authentication process is used in connection with a remote monitoring application. In the system 300, a mobile device 301 collects biometric data from a user or patient 310 on which one or more sensors 311-313 are provided. While any type of biometric data can be collected, a first sensor 311 could be implemented as a smart band-aid to collect breathing and/or nerve activity from the patient 310 which is then transmitted (e.g., over a wireless link 325) to the mobile device 301. In addition or in the alternative, a second sensor 312 could be implemented as a smart band-aid to collect heart rate and/or running activity from the patient 310 which is then transmitted (e.g., over a wireless link 323) to the mobile device 301. As yet another example, a third sensor 313 could be implemented as a smart band-aid to collect vital signs relating to temperature and/or heart rate activity from the patient 310 which is then transmitted (e.g., over a wireless link 324) to the mobile device 301.

Based on the collected biometric data, the mobile device 301 can include a diagnostic module which generates and sends one or more feedback messages 322 to the user/patient 310 as a text message, voice message, etc. The feedback message(s) 322 can report that all vital signs are normal or can instruct the user/patient to change a bandage or smart band-aid sensor. A feedback message 322 could also include an instruction to call the doctor or hospital for health instructions based on the detected biometric data, or could include other information (e.g., a workout summary or other medical update). In addition or in the alternative, the mobile device 301 can provide an alert or other message 320 to a third party entity 360, such as a caregiver or parent. The alert 320 can instruct the third party 360 to call or contact 321 the user/patient 310 if the user/patient does not report back within a predetermined time interval after receiving a user feedback message 322 containing an instruction to call.

For additional processing, review and/or monitoring, the biometric data collected at the mobile device 301 can be directly or indirectly transmitted to a clinic 350 and/or hospital 340 over one or more transmission or signaling links 327-329. For example, biometric data collected while the user/patient 310 is sleeping can be sent over a message link 329 to a sleep clinic 350 to monitor remotely. If the remote monitoring indicates that there is an emergency with the user/patient 310, the clinic 350 sends a notification message 328 to the hospital 340. In addition or in the alternative, the biometric data collected from the user/patient 310 can be sent over a message link 327 to the hospital 340 to monitor remotely. If the remote monitoring indicates that there is an emergency with the user/patient 310, the hospital 340 sends a notification message or ambulance 326 to the user/patient 310.

In addition to using the collected biometric data in connection with remote health monitoring purposes, the collected biometric data can be used, alone or in combination with dynamic location information and/or context information, as authentication factors by sharing the biometric and location data with an authentication service which generates challenge-response pairs based on at least the collected biometric data. Since the mobile device 301 is able to constantly provide updated biometric data securely, attributes of the dynamic personal identification data can be captured and incorporated as an authentication factor after the system 300 has been deployed.

Figure 4:
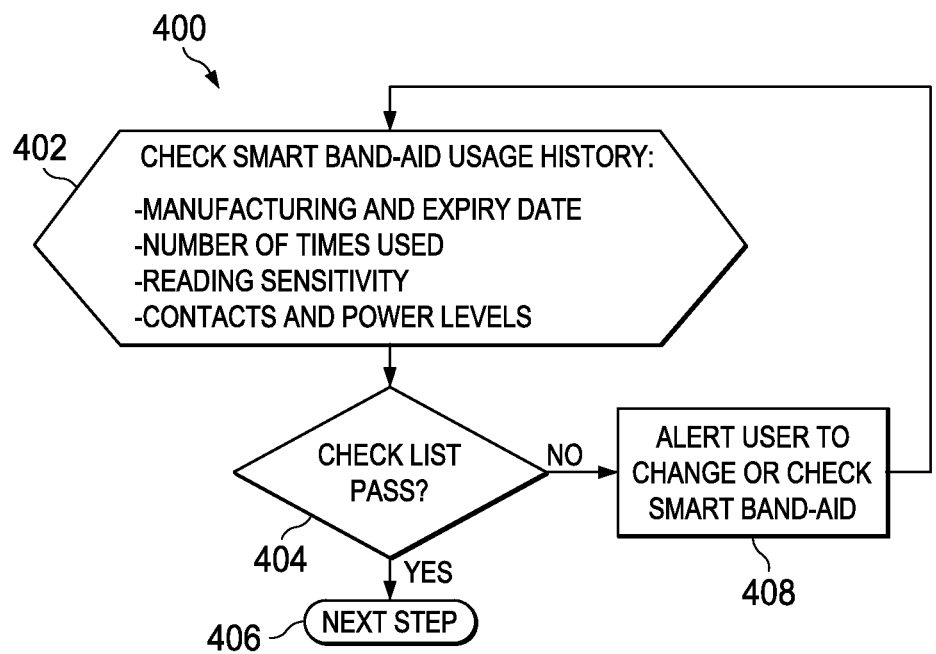
FIG. 4 depicts in flow chart form a sensor check procedure.

To facilitate remote health monitoring applications, the biometric data sensors should be tested and checked before initiating any monitoring operations. To this end, a sensor check or diagnostic process can be performed under control of the mobile device to confirm the operability of any sensor, such as a smart band-aid sensor. An example sensor check procedure is shown in the flow chart sequence 400 depicted in FIG. 4. The depicted sequence begins (step 402) by checking a list of one or more usage history factors of the sensor, which may be an on-body type of sensor or an off-body sensor. The history check can include a number of operations performed by a mobile device, such as checking the date of manufacture and expiration, the number of times the sensor has been used, the reading sensitivity of the sensor, the contact and power levels of the sensor, etc. If the sensor passes the usage history test (affirmative outcome to decision 404), the sequence proceeds to the next step (406). However, if the sensor does not pass the usage history test (negative outcome to decision 404), the user is alerted to change or check the sensor or smart band-aid (step 408), such as by having the mobile device issue a text message or voice message.

Figure 5A:
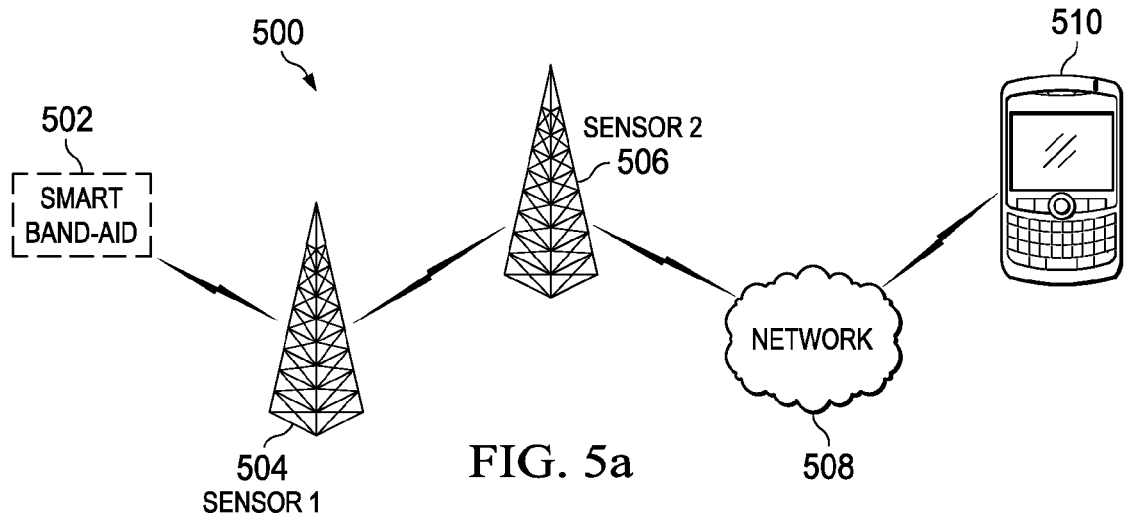
FIG. 5 depicts a system and flow chart of a range check procedure.
Figure 5B:
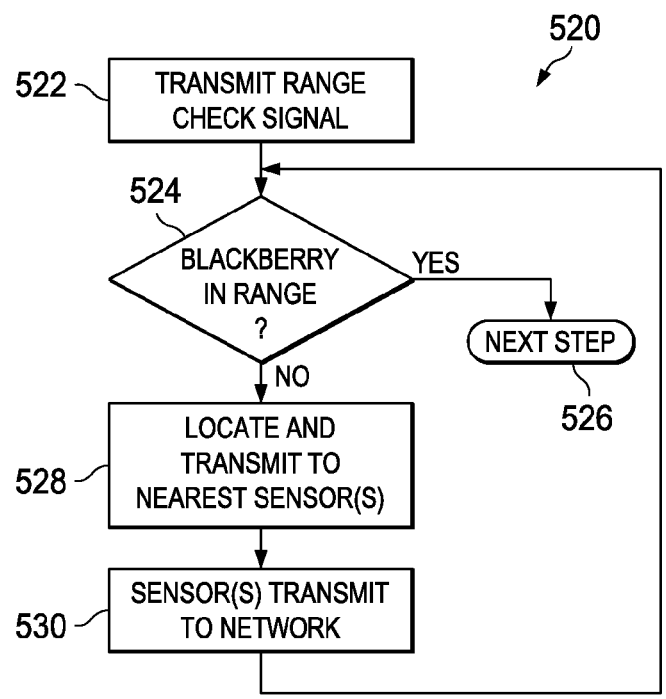

In addition or in the alternative to performing a sensor check, a range check or diagnostic process can be performed to confirm that the sensor is within communication range of a mobile device. An example range check procedure 520 is shown with reference to the depicted system 500 depicted in FIG. 5. In the depicted system 500, the remote sensor or smart band-aid 502 communicates with the BlackBerry mobile device 510 over one or more sensor/relays 504/506 and/or a network 508. In the depicted system, the range check sequence begins (step 522) when the sensor transmits a range check signal that may be used with the BlackBerry mobile device 510. If the BlackBerry mobile device 510 responds to indicate that it is within communication range of the sensor 502 (affirmative outcome to detection decision 524), the sequence proceeds to the next step (526). However, if the BlackBerry mobile device 510 is not within range (negative outcome to decision 524), the sensor 502 locates the nearest sensor/relay(s) and transmits a relay request (at step 528), which in turn may be forwarded to the network 508 (step 530) until a clear and strong communication link or channel is established between the sensor 502 and BlackBerry mobile device 510. As will be appreciated, the communication link can be established directly between the sensor 502 and BlackBerry mobile device 510, or indirectly using one or more sensor/relays 504, 506, alone or in combination with a network 508.

The sensor check and range check steps can be used in connection with a variety of remote health monitoring applications to assure the integrity of the sensor data being collected. In some applications, the sensor check and range check operations are continuously repeated during the monitoring process, and in other applications, they could be performed a single time at startup. In any case, the sensor check and range check steps should be passed before starting any remote monitoring process to assure that the sensors can reliably provide accurate biometric data.

Figure 6:
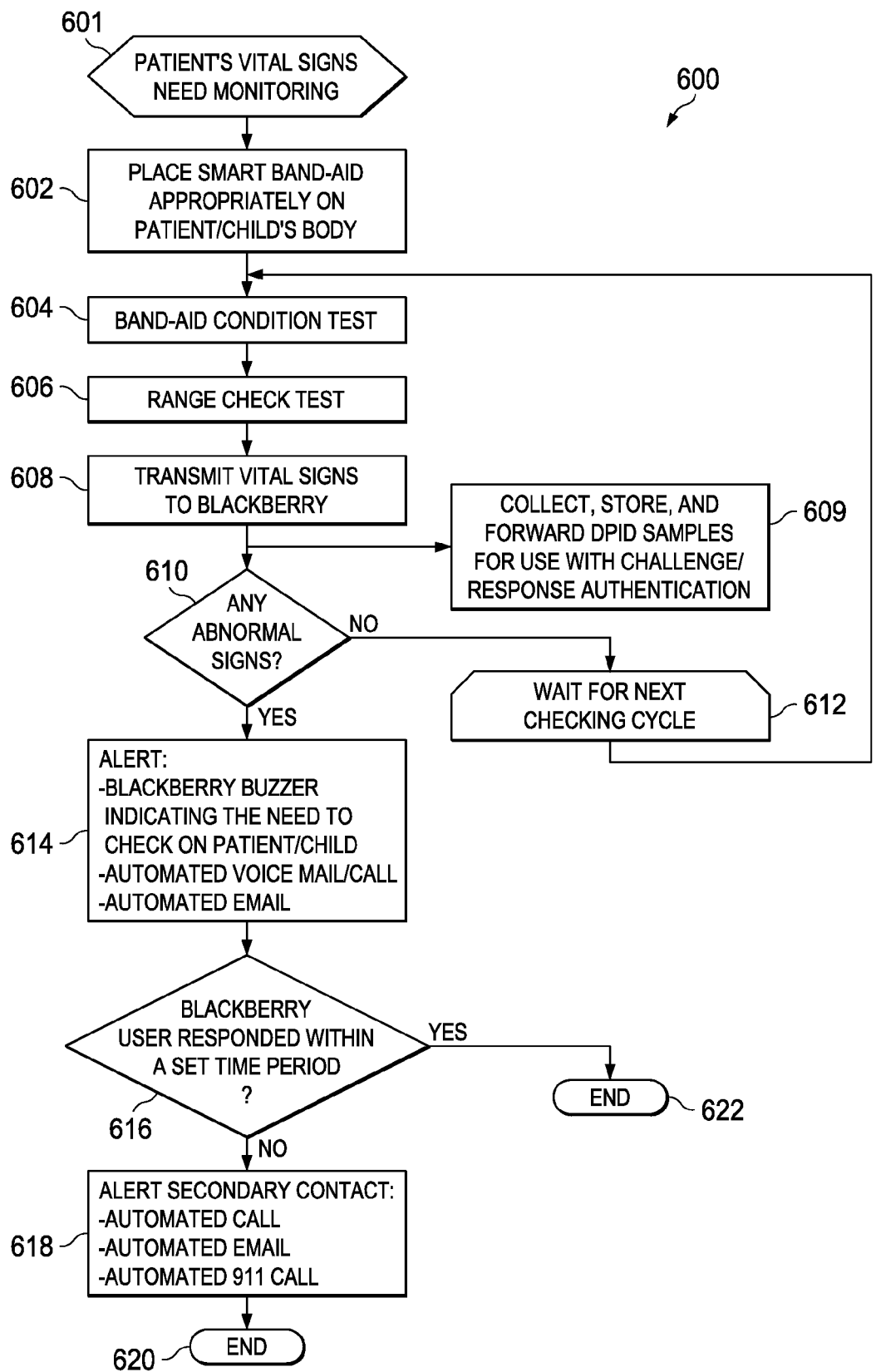
FIG. 6 depicts in flow chart form an over-the-counter procedure to remotely monitor a patient.

Reference is now made to FIG. 6 which depicts in flow chart form an over-the-counter procedure 600 to remotely monitor a patient as part of an over-the-counter monitoring application. The depicted sequence begins (step 601) when a decision is made to monitor the vital signs of a patient or dependent. After placing one or more sensors (e.g., smart band-aids) on the patient's body (step 602), the condition of the sensor is checked (step 604) by checking a list of one or more usage history factors of the sensor, and then the sensor range is checked (step 606) to confirm that the sensor has a clear communication channel to the BlackBerry mobile device. Assuming that the sensor passes the sensor and range check tests, the sensor transmits vital signs from the patient to the BlackBerry mobile device (step 608), such as by using a Bluetooth or other wireless communication signal. At the BlackBerry mobile device, the vital signs are received, and used to collect, store, and forward dynamic personal identification data sample that may be used in connection with the challenge-response authentication process described herein (step 609). The collected vital sign data is processed to identify any abnormal health indications, where the processing can occur at the BlackBerry mobile device, at a hospital, doctor's office, or at any desired location. If there are no abnormal signs detected (negative outcome to detection step 610), then the depicted sequence waits for the next checking cycle (step 612), at which point the sequence can return to the sensor check step (step 604) or simply return to the detection step 610 (not shown). If there is an abnormal sign detected (affirmative outcome to detection step 610), then an alert is issued (step 614). In various embodiments, the alert may take the form of a BlackBerry buzzer message indicating a need to check the patient, or an automated email, voice mail or call to convey information relating to the detected abnormality. If the BlackBerry user responds to the alert within a predetermined time period (affirmative outcome to detection step 616), then the sequence ends (step 622). However, if the BlackBerry user does not respond to the alert within a predetermined time period (negative outcome to detection step 616), then a secondary alert is issued (step 618) and the sequence ends (step 620). As will be appreciated, the secondary alert can take any form, such as a reminder alert to the patient or an alert to a secondary contact with an automated call, email, voice mail, or 911 call. In the depicted sequence 600, the collected vital signs may be used to generate dynamic data samples (step 609) to authenticate the patient at any point when the patient's identity needs to be confirmed. In selected embodiments, continuous authentication can be provided to occur for every S data samples by bundling the Sth biometric data sample with the user's corresponding positioning information into a bundle that is communicated or conveyed from the BlackBerry to the authenticating server.

Figure 7:
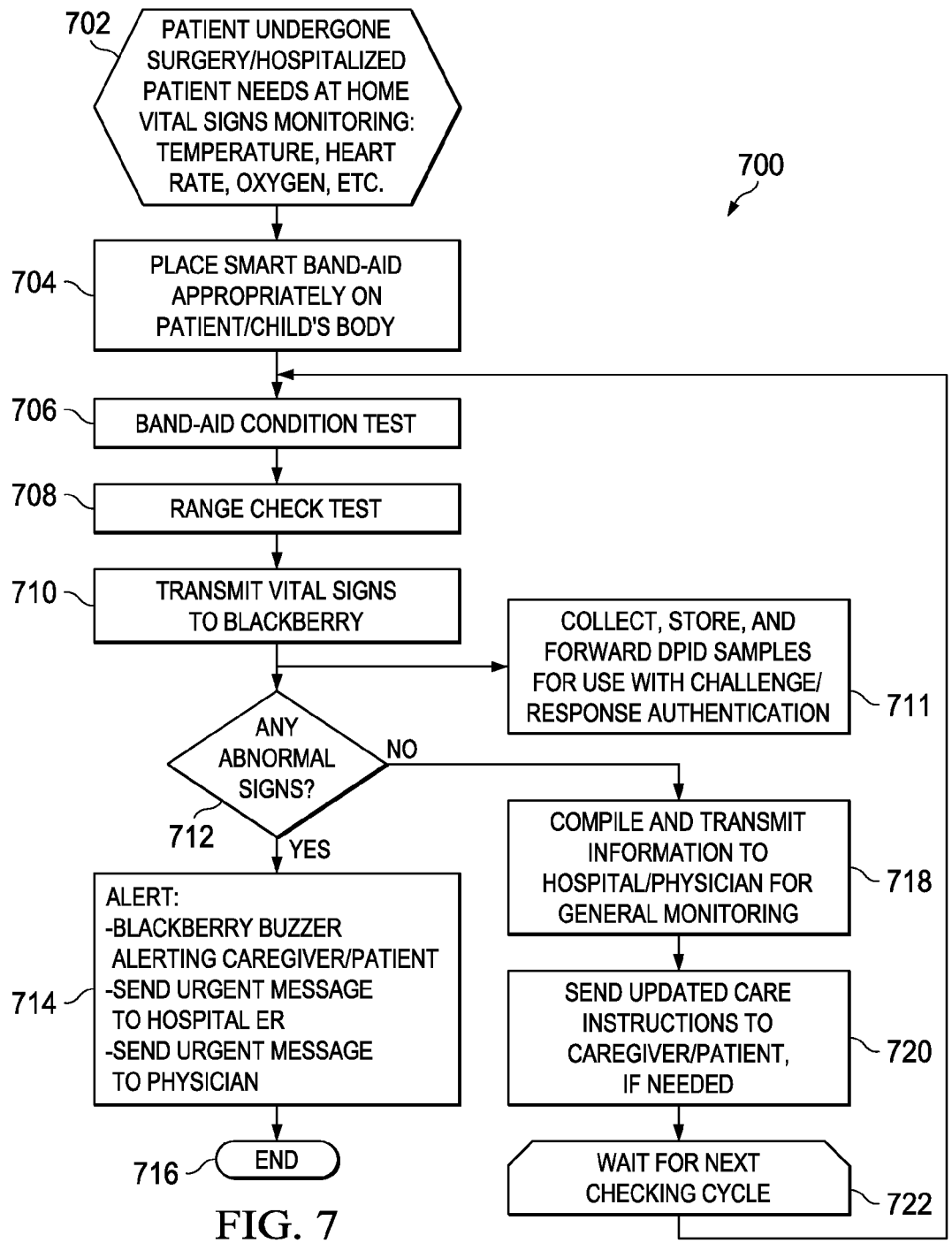
FIG. 7 depicts in flow chart form a post-surgical procedure to remotely monitor a patient.

Reference is now made to FIG. 7 which depicts in flow chart form a post-surgical procedure 700 to remotely monitor a patient at home. The depicted sequence begins (step 702) when a decision is made to monitor the vital signs (e.g., temperature, heart rate, oxygen level, etc.) of a patient at home who has been hospitalized or undergone surgery. After placing one or more sensors (e.g., smart band-aids) on the patient's body (step 704), the condition of the sensor is checked (step 706), following by checking the sensor range (step 708) to confirm that the sensor has a clear communication channel to the BlackBerry mobile device. Next, the sensor transmits vital signs from the patient to the BlackBerry mobile device (step 710), such as by using a Bluetooth or other wireless communication signal. At the BlackBerry mobile device, the vital signs are received, and used to collect, store, and forward dynamic personal identification data sample to use in connection with the challenge-response authentication process described herein (step 711). The collected vital sign data is processed at the BlackBerry mobile device to identify any abnormal health indications (step 712). If there are no abnormal signs detected (negative outcome to detection step 712), then the collected vital sign data is compiled and transmitted to the caregiver (e.g., hospital or doctor) ton monitor (step 718), and the depicted sequence waits for the next checking cycle (step 720), at which point the sequence returns to the sensor check step (step 706) or to the detection step 712 to process the incoming vital sign data (not shown). If there is an abnormal sign detected (affirmative outcome to detection step 712), then an alert is issued (step 714) and the process ends (step 716). As will be appreciated, the alert issued at step 715 may take the form of a BlackBerry buzzer message to the caregiver or patient indicating a need to check the patient, an automated email, voice mail or call to convey information relating to the detected abnormality, an urgent message to the hospital emergency room or physician, or any desired message. Again, the collected vital signs may be used to continuously generate dynamic data samples (step 711) to authenticate the patient at any point when the patient's identity needs to be confirmed.

Figure 8:
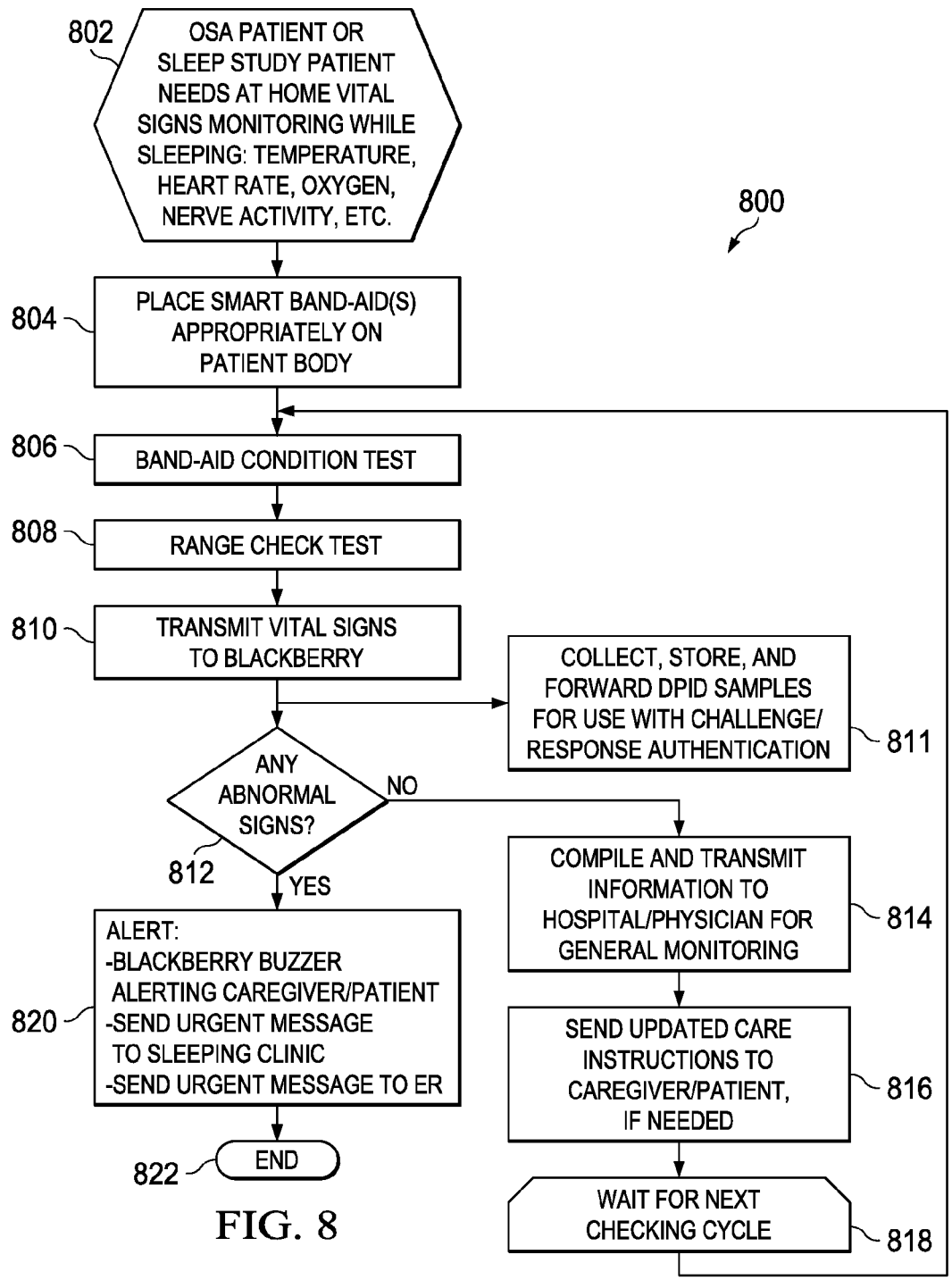
FIG. 8 depicts in flow chart form a procedure to remotely monitor the sleeping conditions of a patient.

FIG. 8 depicts in flow chart form a procedure 800 to remotely monitor the sleeping conditions of a patient at home. The depicted sequence begins (step 802) when a decision is made to monitor the vital signs (e.g., temperature, heart rate, oxygen level, nervous system activity, etc.) of a patient at home who is being treated to obstruct sleep apnea (OSA) or is involved with a sleep study. After placing one or more sensors (e.g., smart band-aids) on the patient's body (step 804), the condition of the sensor(s) is checked (step 806), following by checking the sensor range (step 808) to confirm that the sensor has a clear communication channel to the BlackBerry mobile device. After confirming operation of the sensor(s), each sensor transmits vital signs from the patient to the Black-Berry mobile device (step 810) using any desired communication signal. At the BlackBerry mobile device, the received vital signs are used to collect, store, and forward dynamic personal identification data sample to use with the challenge-response authentication process described herein (step 811). At this step, the collected vital signs may be used to continuously generate dynamic data samples to use in authenticating the patient at any point when the patient's identity needs to be confirmed. In addition, the collected vital sign data is processed at the BlackBerry mobile device to identify any abnormal health indications (step 812). If there are no abnormal signs detected (negative outcome to detection step 812), the collected vital sign data is compiled and transmitted to the caregiver (e.g., hospital or doctor) to monitor (step 814), any required updated care instructions can be sent to the caregiver or patient (step 816), and the depicted sequence waits for the next checking cycle (step 818), at which point the sequence returns to the sensor check step (step 806) or to the detection step 812 to process the incoming vital sign data (not shown). If there is an abnormal sign detected (affirmative outcome to detection step 812), then an alert is issued (step 820) and the process ends (step 822). As will be appreciated, the alert issued at step 820 may take the form of a BlackBerry buzzer message, an automated email, voice mail or call, an urgent message, or any desired message.

Figure 9:
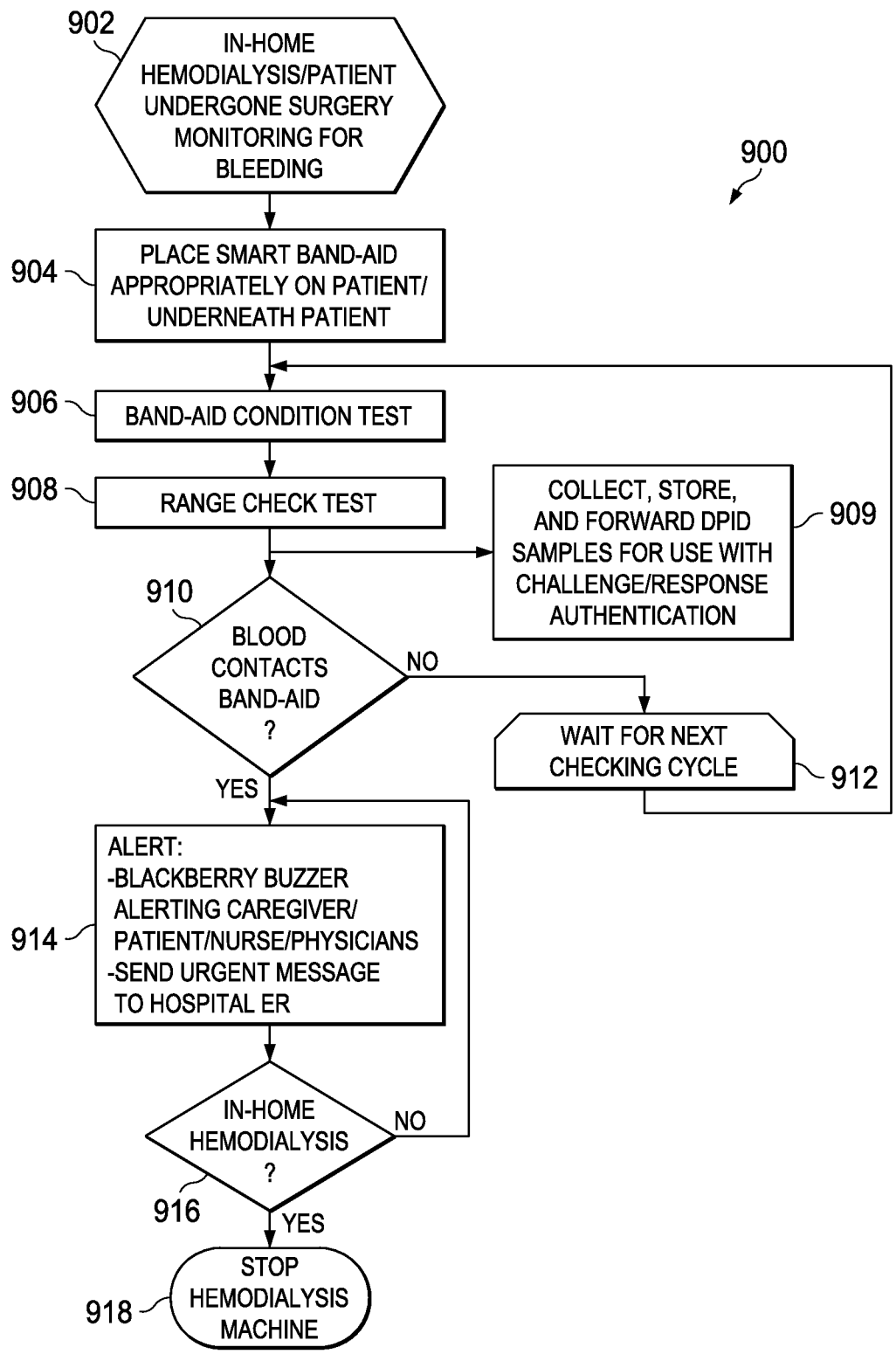
FIG. 9 depicts in flow chart form a procedure to remotely monitor a patient for bleeding.

FIG. 9 depicts in flow chart form a procedure 900 to remotely monitor a patient for bleeding. At step 902, the monitoring process begins when a decision is made to monitor any bleeding by a patient, such as a patient undergoing in-home hemodialysis or recovering from surgery. After placing one or more sensors (e.g., smart band-aids) on the patient's body near a potential source of bleeding (step 904), a sensor check (step 906) and range check (step 908) are performed to confirm that the sensor is operative and in communication channel with the BlackBerry mobile device. After confirming operation of the sensor(s), the BlackBerry mobile device receives one or more biometric measurements which are used to collect, store, and forward dynamic personal identification data sample to use with the challenge-response authentication process described herein (step 909). At this step, the collected vital signs may be used to continuously generate dynamic data samples to use in authenticating the patient at any point when the patient's identity needs to be confirmed. The sensor outputs are monitored at the BlackBerry mobile device to identify any blood that contacts the sensor (step 910). If there no blood is detected (negative outcome to detection step 910), the depicted sequence waits for the next checking cycle (step 912), at which point the sequence returns to the sensor check step (step 906) or to the detection step 910 to process the incoming vital sign data (not shown). If blood is detected (affirmative outcome to detection step 910), an alert is issued (step 914), such as by issuing a BlackBerry buzzer alert message to the caregiver or patient, or sending an automated email, voice mail or call, or issuing an urgent message to the hospital/emergency room. The BlackBerry mobile device then determines if in-home hemodialysis has occurred (step 916). If not (negative outcome to decision 916), another alert (step 914) may be issued. However, upon completion of the dialysis (affirmative outcome to decision 916), the hemodialysis machine is stopped (step 918) and the process ends.

Figure 10:
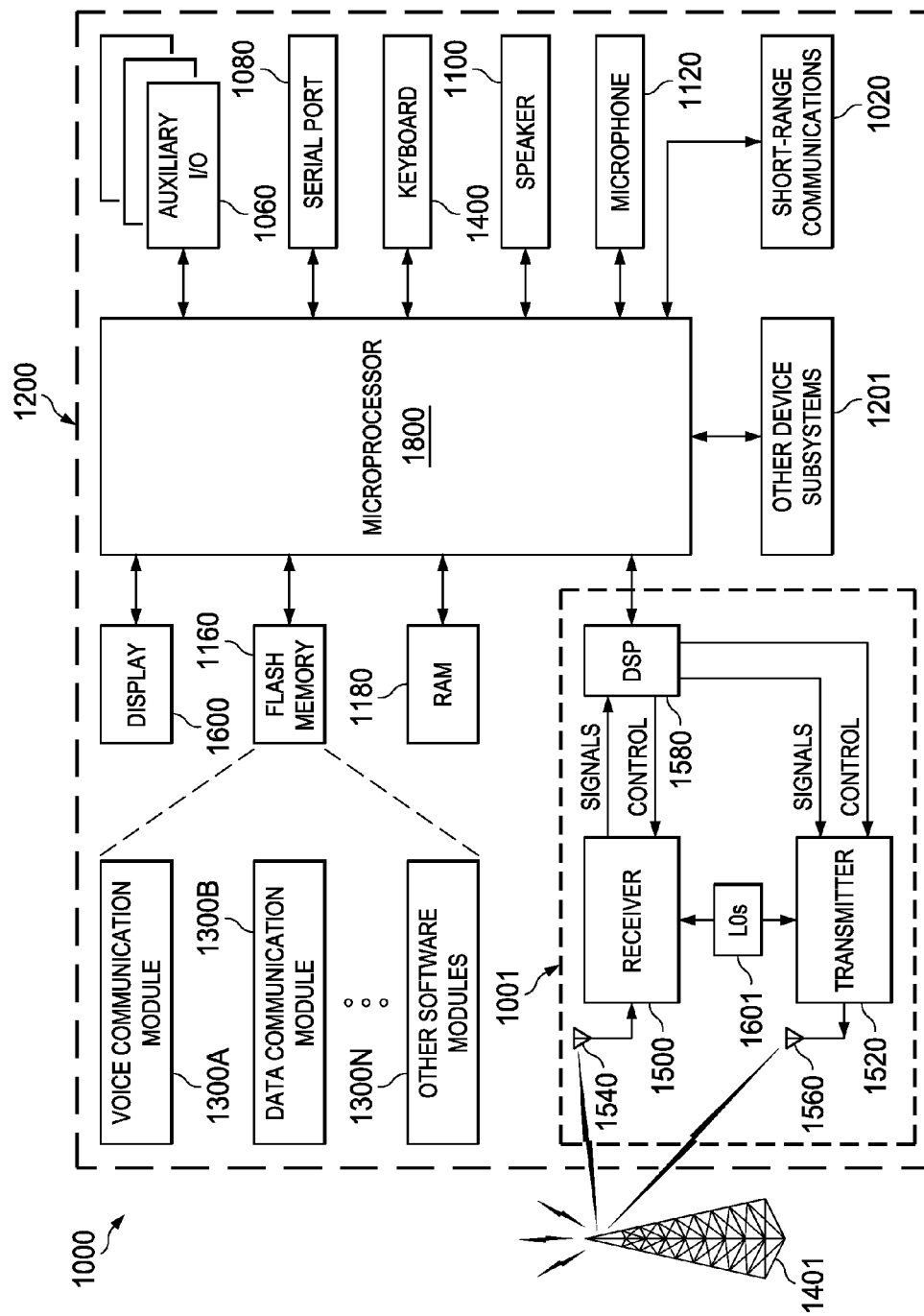
FIG. 10 is a schematic block diagram illustrating exemplary components of a mobile wireless communications device which may be used with selected embodiments of the present inventive concept.

FIG. 10 is a schematic block diagram illustrating exemplary components of a mobile wireless communications device 1000 which uses one or more sensors to continuously collect dynamic biometric and location data samples from a user in order to generate dynamic personal identification data (DPID) samples which are used to authenticate the user. The device 1000 illustratively includes a housing 1200, a keypad 1400, and an output device 1600. The housing 1200 may be elongated vertically, or may take on other sizes and shapes (including clamshell housing structures). The keypad 1400 may be implemented as a keypad, touchpad, or equivalent alphanumeric input, and may include a mode selection key, or other hardware or software to switch between text entry and telephony entry. The output device shown is a display 1600, which may be a full graphic LCD, though other types of output devices may be utilized. A processing device 1800 contained within the housing 1200 is communicatively coupled with the keypad 1400 and the display 1600. The processing device 1800 controls the operation of the display 1600, as well as the overall operation of the mobile device 1000, in response to actuation of keys on the keypad 1400 by the user.

As illustrated schematically in FIG. 10, the mobile device 1000 may include other parts or components, such as of a communications subsystem 1001, a short-range communications subsystem 1020, keypad 1400, display 1600, one or more input/output devices 1060, 1080, 1100 and 1120, memory devices 1160, 1180, and various other device subsystems 1201. The mobile device 1000 is preferably a two-way RF communications device having voice, data, and/or video communications capabilities. In addition, the mobile device 1000 preferably has the capability to communicate with other computer systems via the Internet or other communication networks.

Operating system software executed by the processing device 1800 is preferably stored in a persistent store, such as the flash memory 1160, but may be stored in other types of memory devices, such as a read only memory (ROM) or similar storage element. In addition, system software, specific device applications, or parts thereof, may be temporarily loaded into a volatile memory, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 1401. Preferably, the PIM data items are seamlessly integrated, synchronized and updated via the wireless network 1401 with the device user's corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, LTE Advanced, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIN card, in order to operate on a GPRS network.

When required network registration or activation procedures have been completed, the mobile device 1000 may send and receive communications signals over the communication network 1401. Signals received from the communications network 1401 by the antenna(s) 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 to be process according to digital to analog conversion, frequency up conversion, filtering, amplification and transmission to the communication network 1401 (or networks) via the antenna(s) 1560.

In addition to processing communications signals, the DSP 1580 provides to control the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 to output via the display 1600, or alternatively to some other auxiliary I/O device 1060. A device user may also compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals that may be transmitted are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, or a Bluetooth™ communications module to allow communication with similarly-enabled systems and devices.

By now, it will be appreciated that there has been provided a method and apparatus to authenticate a user of a computer via a handheld electronic device, such as a BlackBerry device. As disclosed, a first set of dynamic personal identification data samples that are specific to the user (e.g., biometric and/or time-associated location data samples associated with the user or handheld device) are collected over time, such as by collecting data samples from one or more sensors located proximate to the user. The first set of dynamic personal identification data samples is stored and may be accessed by the handheld electronic device (e.g., at the handheld device or at a location accessible by the handheld device, such as a securely connected server computer). A copy of the first set of dynamic personal identification data samples is sent to a remote computing device to be stored as a second set of dynamic personal identification samples. Thereafter, the handheld electronic device receives an authentication challenge which is computed based on at least a subset of the second set of dynamic personal identification samples. In selected embodiments, the authentication challenge requests an N-tuple which is computed by a remote authentication server based on at least a subset of the second plurality of dynamic personal identification samples, where the computed N-tuple may have a randomly generated length, randomly generated sequence, or a randomly generated length and sequence. As will be appreciated, a different authentication challenge can be computed each time the user requests authentication. In response to the authentication challenge, the handheld device computes a first authentication response to the authentication challenge based on at least a subset of the first set of dynamic personal identification samples to authenticate the user if the first authentication response corresponds to the authentication challenge. In selected embodiments, the first authentication response is computed as an N-tuple based on at least a subset of the first plurality of dynamic personal identification samples to authenticate the user if the first authentication response corresponds to the authentication challenge. In other embodiments, the authentication response is computed as first and second N-tuples in response to the authentication challenge, where the first N-tuple with a first length and sequence is generated from at least a subset of a first plurality of biometric data samples associated with the user, and where the second N-tuple with a second length and sequence is generated from at least a subset of a first plurality of location data samples associated with the handheld electronic device. By sending the first authentication response to a remote authentication server, it can be compared with a second authentication response computed at the remote authentication server in response to the authentication challenge based on at least a subset of the second plurality of dynamic personal identification samples to authenticate the user if the second authentication response matches the first authentication response. The authentication process may also be used in the reverse direction by having the handheld electronic device compute a second authentication challenge (based on at least a subset of the first plurality of dynamic personal identification samples) and send the second authentication challenge to the remote computing device which computes a second authentication response (based on at least a subset of the second plurality of dynamic personal identification samples) and then sends the second authentication response to the handheld electronic device to authenticate the remote computing device if the second authentication response corresponds to the second authentication challenge.

In other embodiments, there is disclosed an authentication system and methodology having first and second computing devices. The first computing device is configured to request data access by storing dynamic personal identification data samples specific to an individual and generating a challenge response in response to any received challenge question. In selected embodiments, the data samples can be stored at the first computing device or at a server computer that is securely connected to the first computing device. One or more sensors may be located proximate to the individual to collect a biometric data samples associated with the individual and transmitting the biometric data samples to the first computing device to store as at least part of the dynamic personal identification data samples. In addition, the first computing device may be configured collect a location data samples associated with the first computing device to store as at least part of the dynamic personal identification data samples. The second computing device is configured to authenticate a data access request from the first computing device by storing a copy of the dynamic personal identification data samples, formulating a first challenge question based on at least a subset of the copy of the dynamic personal identification samples, and authenticating the data access request from first computing device if a first challenge response received from the first computing device corresponds to the first challenge question. As configured, the second computing device may formulate the first challenge question as a request for an N-tuple based on at least a subset of the copy of the dynamic personal identification samples, where the N-tuple has a randomly generated length, randomly generated sequence, or a randomly generated length and sequence. In addition, the second computing device may be configured to formulate a different challenge question each time the first computing device requests data access. In operation, the first computing device generates a challenge response in response to a challenge question received from the second computing device by generating first and second N-tuples. The first N-tuple may be generated from at least a subset of a biometric data samples associated with the individual to have a first length and sequence, and the second N-tuple may be generated from at least a subset of a location data samples associated with the first computing device to have a second length and sequence, where the first length and sequence can be the same as or different from the second length and sequence. In the reverse direction, the first computing device may be configured to authenticate the second computing device by formulating a second challenge question based on at least a subset of the dynamic personal identification samples, and then sending the second challenge question to the second computing device which then computes a second challenge response based on at least a subset of the copy of the dynamic personal identification samples. After the second challenge response is returned, the first computing device authenticates the second computing device if the second challenge response corresponds to the second challenge question.

In still further embodiments, there is disclosed a computer readable storage medium embodying computer program code with computer executable instructions configured to authenticate information from a computer. Under control of the computer program code, a plurality of dynamic personal identification data samples are stored that are specific to a user associated with the computer, where a copy of the plurality of dynamic personal identification data samples is also stored at a remote computer. The plurality of dynamic personal identification data samples include biometric data samples specific to the user and corresponding location data samples associated in time with the biometric data samples. In addition, an authentication challenge is generated which requests a first N-tuple that is computed from at least a subset of the copy of the plurality of dynamic personal identification samples stored at the remote computer, and the authentication challenge is sent to the remote computer. Finally, the first N-tuple from the remote computer is received to authenticate information from the remote computer if the first N-tuple matches a second N-tuple that is computed from at least a subset of the plurality of dynamic personal identification samples. In selected embodiments, the computer program code is embodied in an authentication server computer configured to authenticate information from a remote handheld computer which collects the plurality of biometric data samples specific to the user and the corresponding plurality of location data samples specific to the remote handheld computer. In other embodiments, the computer program code is embodied in a handheld computer configured to authenticate information from a remote server computer which stores a copy of the plurality of dynamic personal identification data samples.

Although the described exemplary embodiments disclosed herein are described with reference to a continuous challenge-response authentication algorithm which uses dynamic personal information data samples, such as biometric and location information, the present inventive concept is not necessarily limited to the example embodiments which illustrate inventive aspects of the present inventive concept that are applicable to a wide variety of authentication algorithms. Thus, the particular embodiments disclosed above are illustrative only and should not be taken as limitations upon the present inventive concept, as the inventive concept may be modified and practiced in different but equivalent manners apparent to those skilled in the art having the benefit of the teachings herein. Accordingly, the foregoing description is not intended to limit the inventive concept to the particular form set forth, but on the contrary, is intended to cover such alternatives, modifications and equivalents as may be included within the spirit and scope of the inventive concept as defined by the appended claims so that those skilled in the art should understand that they can make various changes, substitutions and alterations without departing from the spirit and scope of the inventive concept in its broadest form.

What is claimed is:

1. A method of authenticating a user via a handheld electronic device, comprising:

storing at the handheld electronic device a first plurality of dynamic personal identification data samples specific to the user that are collected over time, wherein the first plurality of dynamic personal identification data samples comprises a plurality of biometric data samples associated with the user and a corresponding plurality of location data samples associated with the handheld electronic device;

sending a copy of the first plurality of dynamic personal identification data samples to a remote computing device to be stored as a second plurality of dynamic personal identification samples;

receiving at the handheld electronic device an authentication challenge that is based on the second plurality of dynamic personal identification samples and based on how many dynamic personal identification data samples are saved on the handheld electronic device; and computing at the handheld electronic device a first authentication response to the authentication challenge based on the plurality of biometric data samples and the plurality of location data samples.

2. The method of claim 1, further comprising collecting at least a subset of the first plurality of dynamic personal identification data samples from at least a first sensor located proximate to the user.

3. The method of claim 1, where storing the first plurality of dynamic personal identification data samples comprises storing over time the plurality of biometric data samples associated with the user.

4. The method of claim 3, wherein the first plurality of dynamic personal identification data samples comprises time information associated with the plurality of biometric data samples.

5. The method of claim 1, further comprising receiving either a first indication of authorization or second indication of non-authorization based on a comparison of the authentication challenge and the first authentication response.

6. The method of claim 1, where receiving an authentication challenge comprises receiving a request for an N-tuple that is computed by a remote authentication server based on at least a subset of the second plurality of dynamic personal identification samples.

7. The method of claim 1, where computing the first authentication response comprises computing an N-tuple based on at least a subset of the first plurality of dynamic personal identification samples to authenticate the user in response to the first authentication response corresponding to the authentication challenge.

8. The method of claim 1, further comprising sending the first authentication response to a remote authentication server to compare with a second authentication response computed at the remote authentication server in response to the authentication challenge based on at least a subset of the second plurality of dynamic personal identification samples to authenticate the user in response to the second authentication response matching the first authentication response.

9. The method of claim 1, where receiving the authentication challenge comprises receiving a different authentication challenge each time the user requests authentication.

10. The method of claim 1, further comprising:
computing at the handheld electronic device a second authentication challenge based on at least a subset of the first plurality of dynamic personal identification samples;

sending the second authentication challenge to the remote computing device to compute a second authentication response based on at least a subset of the second plurality of dynamic personal identification samples; and receiving at the handheld electronic device the second authentication response to authenticate the remote computing device when the second authentication response corresponds to the second authentication challenge.

11. The method of claim 1, where the storing at the handheld electronic device the first plurality of dynamic personal identification data samples comprises storing the first plurality of dynamic personal identification data samples on a server computer that is securely connected to the handheld electronic device.

12. The method of claim 6, where the N-tuple that is computed by the remote authentication server includes at least one of a randomly generated length, and a randomly generated sequence.

13. The method of claim 1, where computing the first authentication response comprises:
generating a first N-tuple having a first length and sequence from at least a subset of a first plurality of biometric data samples associated with the user; and generating a second N-tuple having a second length and sequence from at least a subset of a first plurality of location data samples associated with the handheld electronic device, where the first N-tuple and second N-tuple are each generated in response to the authentication challenge.

14. An authentication system, comprising:
a first computing device configured to request data access by:
storing a first plurality of dynamic personal identification data samples specific to an individual, wherein the first plurality of dynamic personal identification samples comprises a plurality of biometric data samples associated with a user and a corresponding plurality of location data samples associated with the first computing device, and generating a first challenge response in response to a first challenge question, wherein the first challenge response is based on the plurality of biometric data samples and the plurality of location data samples; and a second computing device configured to authenticate a data access request from the first computing device by:
storing a copy of the first plurality of dynamic personal identification data samples, formulating a first challenge question based on the copy of the first plurality of dynamic personal identification samples and based on how many dynamic personal identification samples are on the first computing device, and authenticating the data access request based on a comparison of the first challenge response to the first challenge question.

15. The authentication system of claim 14, where the first computing device is configured to generate the first challenge response by:
generating a first N-tuple having a first length and sequence; and generating a second N-tuple having a second length and sequence, where the first N-tuple and the second N-tuple are each generated in response to the first challenge question received from the second computing device.

16. The authentication system of claim 14, further comprising one or more sensors located proximate to the individual to collect the plurality of biometric data samples associated with the individual and to transmit the plurality of biometric data samples to the first computing device to store as at least part of the first plurality of dynamic personal identification data samples.

17. The authentication system of claim 14, where the first computing device is further configured to collect time information associated with the plurality of biometric data samples.

18. The authentication system of claim 14, where the second computing device is configured to formulate a different challenge question each time the first computing device requests data access.

19. The authentication system of claim 14, where the first computing device is configured to authenticate the second computing device by:
- formulating a second challenge question based on the first plurality of dynamic personal identification samples,
- sending the second challenge question to the second computing device to compute a second challenge response based on the copy of the first plurality of dynamic personal identification samples, and
- receiving the second challenge response to authenticate the second computing device when the second challenge response corresponds to the second challenge question.

20. The authentication system of claim 14, where the first computing device is configured to store the first plurality of dynamic personal identification data samples at the first computing device or at a server computer that is securely connected to the first computing device.

21. The authentication system of claim 14, where the second computing device is configured to formulate the first challenge question as a request for an N-tuple based on at least a subset of the copy of the first plurality of dynamic personal identification samples, where the N-tuple includes at least one of a randomly generated length and randomly generated sequence.

22. A non-transitory computer readable storage medium embodying computer program code, the computer program code comprising computer executable instructions configured to authenticate information from a computer by:
- storing a plurality of dynamic personal identification data samples specific to a user associated with the computer, where a copy of the plurality of dynamic personal identification data samples is also stored at a remote computer, and where the plurality of dynamic personal identification data samples comprises a plurality of biometric data samples specific to the user and a corresponding plurality of location data samples associated in time with the plurality of biometric data samples;
- generating an authentication challenge that requests a first N-tuple that is:
    - based on how many dynamic personal information data samples are save on the computer, and
    - computed from a copy of the plurality of biometric data samples and a copy of the location data samples stored at the remote computer;
- sending the authentication challenge to the remote computer; and
- receiving the first N-tuple from the remote computer for purposes of authenticating information from the remote computer in response to the first N-tuple matching a second N-tuple that is computed from the plurality of dynamic personal identification samples.

23. The computer readable storage medium of claim 22, where the computer program code is embodied in an authentication server computer configured to authenticate information from a remote handheld computer that collects the plurality of biometric data samples specific to the user and the corresponding plurality of location data samples specific to the remote handheld computer.

24. The computer readable storage medium of claim 22, where the computer program code is embodied in a handheld computer configured to authenticate information from a remote server computer that stores a copy of the plurality of dynamic personal identification data samples.

25. The method of claim 1, wherein, there are S dynamic identification data samples saved on the handheld electronic device, and wherein the authentication challenge is an N-tuple such that $1 \leq N \leq S$.

26. The authentication system of claim 14, wherein the second computing device is further configured to determine that the first computing device is spoofing an identity when the plurality of location data samples comprises a second location data sample that indicates an abrupt change from a first location data sample.

27. The computer readable storage medium of claim 22, wherein the computer executable instructions are further configured to authenticate information from the computer by determining whether the computer is spoofing an identity when the plurality location data samples comprises a first location data sample that indicates a location that is not feasible.

* * * * *